(12) United States Patent
Tretter

(10) Patent No.: US 7,057,767 B2
(45) Date of Patent: Jun. 6, 2006

(54) AUTOMATIC BACKGROUND REMOVAL METHOD AND SYSTEM

(75) Inventor: Daniel Tretter, Palo Alto, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1139 days.

(21) Appl. No.: 09/801,038

(22) Filed: Mar. 6, 2001

(65) Prior Publication Data

US 2002/0154322 A1    Oct. 24, 2002

(51) Int. Cl.
*H04N 1/40* (2006.01)
(52) U.S. Cl. .......................... 358/1.9; 358/2.1
(58) Field of Classification Search ............. 358/1.9, 358/2.1, 464–468
See application file for complete search history.

(56) References Cited

U.S. PATENT DOCUMENTS

| | | | |
|---|---|---|---|
| 5,157,740 A | 10/1992 | Klein et al. ................. 382/51 |
| 5,282,061 A | 1/1994 | Farrell ......................... 358/464 |
| 5,761,339 A | 6/1998 | Ikeshoji et al. ............ 382/176 |
| 5,845,017 A | 12/1998 | Keyes | |
| 5,903,660 A * | 5/1999 | Huang et al. ............... 382/132 |
| 5,956,468 A | 9/1999 | Ancin .......................... 395/109 |
| 6,542,621 B1 * | 4/2003 | Brill et al. .................. 382/103 |
| 6,774,889 B1 * | 8/2004 | Zhang et al. ............... 345/173 |

FOREIGN PATENT DOCUMENTS

| | | |
|---|---|---|
| EP | 0963106 | 12/1999 |
| WO | WO9952275 | 10/1999 |

* cited by examiner

*Primary Examiner*—Thomas D. Lee
*Assistant Examiner*—Stephen Brinich

(57) ABSTRACT

A method and system for automatically removing noise from images. First, a current pixel is received. Next, an activity metric of the current pixel is computed by using the current pixel and a neighborhood of pixels related to the current pixel. Then, a distance metric that indicates the likelihood that the current pixel is a background pixel is computed by using the activity metric and at least one background parameter. The distance metric provides a soft thresholding framework for the background removal. The current pixel is modified based on the distance metric.

20 Claims, 7 Drawing Sheets

AUTOMATIC BACKGROUND REMOVAL METHOD AND SYSTEM

FIELD OF THE INVENTION

The present invention relates to image processing, and more specifically, to an automatic background removal method and system.

BACKGROUND OF THE INVENTION

Scanners and copiers are well-known office machines that provide valuable office functions both in the workplace and at home. One important component of these scanners and copiers is the image processing that automatically filters noise (unwanted information) from the scanned document.

The primary object of background removal is the removal of noise from a scanned document. First, there is the problem of background noise. Second, there is the problem of bleed through that stems from very thin originals.

One example of noise in the document is commonly referred to as "bleed through" and typically occurs when the document to be scanned is a very thin piece of paper (e.g., a page from a magazine etc.). The words or pictures from the backside of the document being scanned bleed through and are rendered as part of the current side's pictures and words. As can be appreciated, this "bleed through" severely degrades the quality of the copy or scanned document.

Another example of noise in the original document is a coffee stain on a white piece of paper. The stained area will appear darker that the remaining background of the document. If this stain is not detected and removed, the resulting scanned image will appear to have a dark spot where the stain is. Another example of what might erroneously be characterized as noise is a color background (e.g., a document printed on green piece of paper).

With the advent of color scanners and color copiers, this problem is aggravated since the image processing must be able to distinguish the color background that should be removed and color graphics, pictures, etc. that should be left alone.

It would be desirable to have image processing software to automatically remove noise (e.g., background or bleed through) without erroneously deleting important content. Unfortunately, as described in greater detail hereinafter, the prior art approaches only offer tolerable solutions that suffer from various disadvantages.

There are three main prior art approaches to background removal or noise removal. Each of these approaches is briefly described hereinafter and their respective shortcomings are set forth.

U.S. Pat. No. 5,956,468 entitled, "Document Segmentation System", H. Ancin, U.S. Pat. No. 5,956,468, September 1999, uses a window-based algorithm for background removal and text enhancement. Unfortunately, this technique is a two-pass approach that requires a lower resolution version of the entire document (commonly referred to as a "pre-scan") to determine the enhancement. With the advent of scanners and copiers that employ an automatic document feeder, requiring a user to feed a document through the scanner and copier twice is awkward at best and may not be readily accepted by users. In addition, additional memory is needed for such an approach.

U.S. Pat. No. 5,157,740 entitled, "Method for Background Suppression in an Image Data Processing System", by R. Klein, K. A. Wilds, M. Higgins-Luthman, and D. C. Williams, October 1992, and U.S. Pat. No. 5,282,061 entitled, "Programmable Apparatus for Determining Document Background Level", B. L. Farrell, January 1994, also use window-based algorithms, but they explicitly classify pixels as "background" or "signal" pixels based on neighborhood information. A major disadvantage of these approaches is that a misclassification in such a system often leads to objectionable artifacts, such as areas in the scanned document of noise (ones and zeros where the image processing classifies some pixels as background that are subsequently set to white and other pixels in the region as important information that is not affected or modified.

U.S. Pat. No. 5,761,339 entitled, "Method and Recording Medium for Separating and Composing Background and Character Image Data", N. Ikeshoji, T. Yamamoto, T. Kamiuchi, N. Hamada, K. Honda, and H. Yamakawa, June 1998, uses a nonlinear filter to estimate the background value at each pixel and then subtracts this background image from the original image to push the background to white and remove stains in the image. Although this approach provides tolerable results for text and lines, the approach could produce artifacts in regions of scanned photos, halftones, or solid fills. For example, a bright red object would have a red outline, but would have the center portion set to the background color (e.g., white) for a disturbing effect. Similarly, photographs with a person wearing a bright blue shirt would be rendered as a white shirt with a blue outline.

Based on the foregoing, there remains a need for a method and system for automatically removing background that employs soft thresholding, that avoids the artifacts due to hard thresholding, that accurately removes noise from scanned photographs, halftones, and solid fills without removing important content, and that overcomes the disadvantages set forth previously.

SUMMARY OF THE INVENTION

One aspect or feature of the present invention is the use of a sliding window that does not require a pre-scan. Consequently, only a few pixel rows need to be buffered rather than the entire image.

Another aspect of the present invention is the use of a soft thresholding framework, such as a probabilistic framework, to estimate probabilities that a pixel is background. The use of soft thresholding leads to a "soft" classification rather than a hard thresholding and resulting "hard" classification, thereby avoiding the artifacts (e.g., a noisy area in the document where misclassifications of the background are readily apparent) common with hard thresholding approaches.

The present invention provides a method and system for automatically removing noise by employing a soft thresholding framework, an activity metric, and a distance metric that is based on the activity metric. First, a current pixel is received. Second, an activity of the current pixel is determined by using the current pixel and a neighborhood of pixels related to the current pixel (e.g., a square window centered around the current pixel). An activity metric is utilized for determining pixel values that are part of a scanned halftone region. Third, a distance metric for indicating the likelihood that the current pixel is a background pixel is determined by using the activity metric and at least one background parameter. Fourth, the current pixel is selectively modified based on the pixel value and the distance metric. The background parameters are updated based on the distance metric.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE PREFERRED EMBODIMENT

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

According to one aspect of the present invention, a sliding neighborhood (e.g., a square window) of pixels is utilized to estimate the probability that a current pixel is a background pixel. By avoiding an explicit classification, the automatic background removal (ABR) present invention provides more robust results and fewer artifacts than the prior art "classify and threshold" scheme. Furthermore, the ABR mechanism present provides a single pass approach that avoids the expense of modifying scanner hardware and the poor quality that often results from binarizing a document, which is a needed step in the prior art two-pass approach. The parameters that are utilized by the present invention are also updated dynamically as the page is processed.

According to another aspect of the present invention, a probabilistic approach that can adapt rapidly to changes in the document is provided. This probabilistic approach that adapts to the document can substantially remove artifacts due to bleed-through or stains on the document. Moreover, the speed of adaptation to the data can also be controlled, so the algorithm adapts faster initially and then settles to a slower pace as more pixels are examined. By allowing adjustment of the speed of adaptation, the present invention prevents the ABR mechanism from over-fitting to the data.

Office Machine 100

Figure 1:
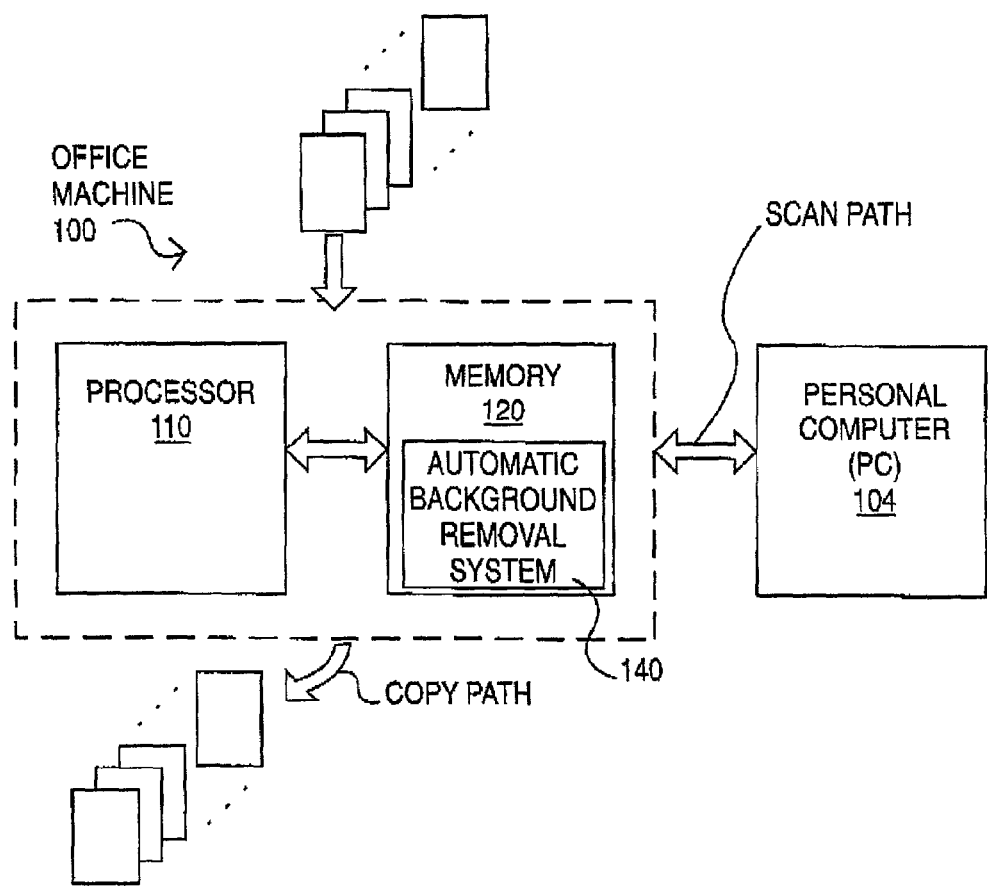
FIG. 1 is a block diagram of an office machine in which the automatic background removal method and system can be implemented.

FIG. 1 is a block diagram of an office machine 100 in which the automatic background removal method and system can be implemented. The office machine 100 includes a processor 110 for executing instructions and a memory 120 for storing programs and data.

The memory 120 includes an automatic background mechanism 140 of the present invention. The office machine 100 can, for example, be a scanner, a copier, or an all-in-one machine.

Preferably, the automatic background removal method and system of the present invention is implemented in software, such as a part of a driver program associated with a particular office machine (e.g., scanner or copier) or as part of an image processing application software. Accordingly, an exemplary embodiment of the automatic background removal method and system of the present invention is described hereinafter as a software program.

However, it is to be appreciated that the present invention can be implemented in software, firmware, hardware, or a combination thereof. When implemented in firmware, a program embodying the teaching of the present invention can, for example, be embedded into a micro-controller or a digital signal processor. When implemented in firmware, the teaching of the present invention can, for example, be hard-wired into an application specific integrated circuit (ASIC) or other custom hardware.

Automatic Background Removal Program

Figure 2:
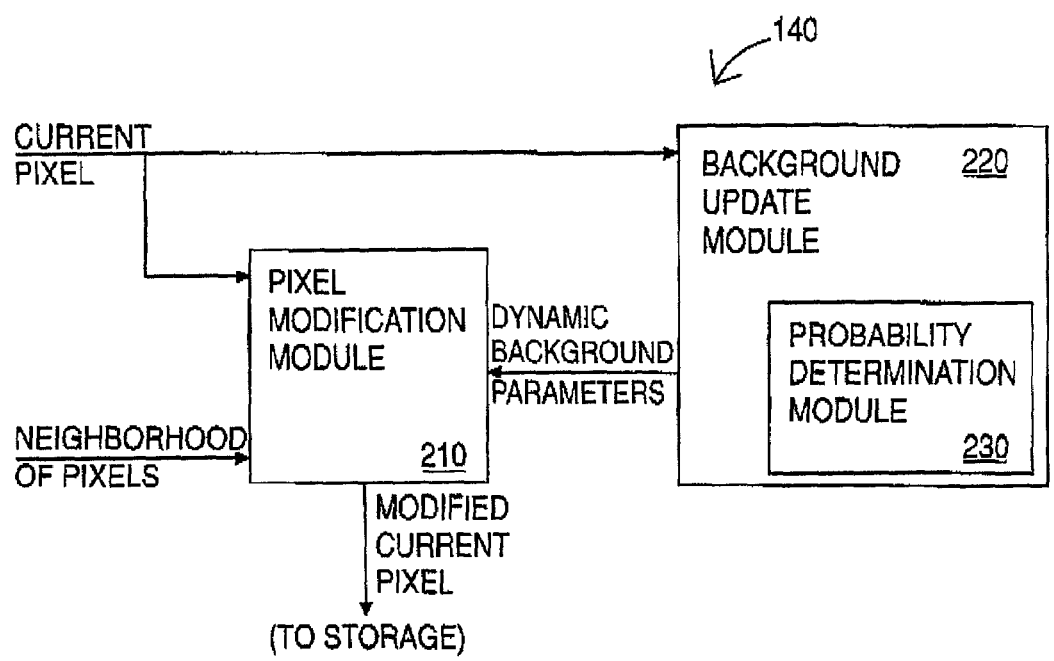
FIG. 2 is a block diagram illustrating in greater detail an exemplary automatic background removal program configured in accordance with one embodiment of the present invention.

FIG. 2 is a block diagram illustrating in greater detail an exemplary automatic background removal program 140 configured in accordance with one embodiment of the present invention. The automatic background removal program 140 includes a pixel modification module 210 for receiving a current pixel, a neighborhood of pixels, and dynamic background parameters (e.g. an expected background color), that are described in greater detail hereinafter. Based on these inputs, the pixel modification module 210 selectively modifies the current pixel value to generate a modified pixel value.

The automatic background removal program 140 also includes a background update module 220 for automatically updating the background threshold based on the modified current pixel value.

The background update module 220 includes a probability determination module 230 for computing the probability that a current pixel is a background pixel based on the value of the current pixel and the dynamic background threshold.

Automatic Background Removal Processing

Figure 3:
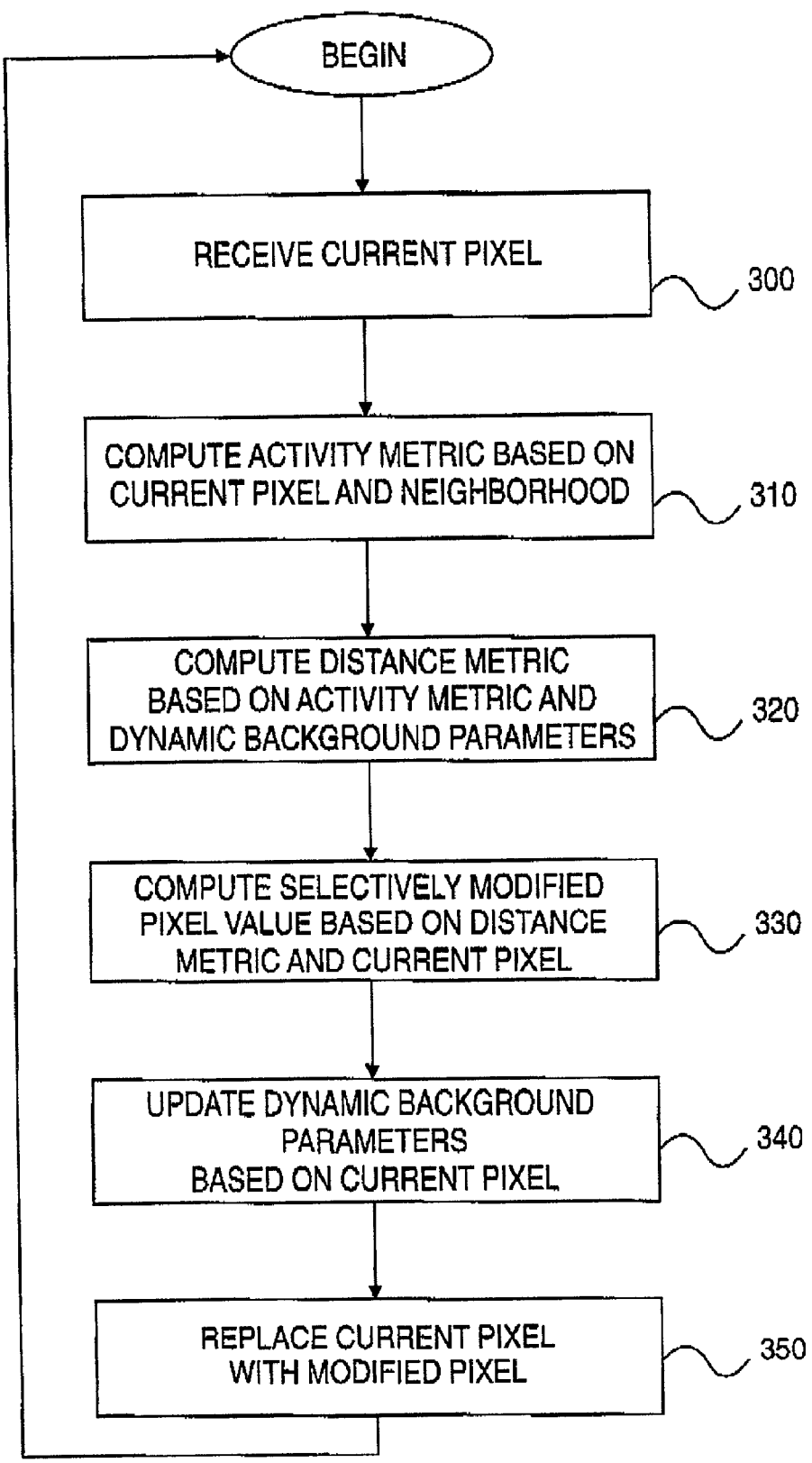
FIG. 3 is a flowchart illustrating the steps performed by the automatic background removal program of FIG. 1.

FIG. 3 is a flowchart illustrating the steps performed by the automatic background removal program of FIG. 1. In step 300 a current pixel is received. In step 310, an activity metric of the current pixel is computed by using the current pixel and a neighborhood of pixels related to the current pixel. In step 320, a distance metric for indicating the likelihood that the current pixel is a background pixel is computed by using the activity metric and at least one dynamic background parameter. The distance metric provides a soft thresholding framework for the automatic background removal. In step 330, a modified current pixel value is computed based on the distance metric and the current pixel value. In step 340, the dynamic background parameters are updated based on the current pixel value. In step 350, the current pixel is replaced with the modified current pixel value.

Suppose background removal needs to be performed as a document is being scanned. In a copying application, for example, the entire image may never be buffered, so any processing must be performed using only a few image rows at a time. The automatic background removal (ABR) method and system of the present invention uses a sliding neighborhood of pixels. This neighborhood can be a window with any shape and any number of pixels. For example, the window can be, but is not limited to, a square of pixels with the current pixel value being in the center of the window (e.g., a 3×3 square of pixels or a 5×5 square of pixels). It is noted that the number of pixels employed in the window and the exact geometry of the window can be varied to suit a particular application.

The background color and variation are estimated from the data as the image is being scanned, and pixels that are in the expected range are pushed towards a predetermined color (e.g., white). Preferably, the ABR method and system of the present invention operates in a luminance-chrominance color space, such as CIELab or YCrCb.

Figure 7:
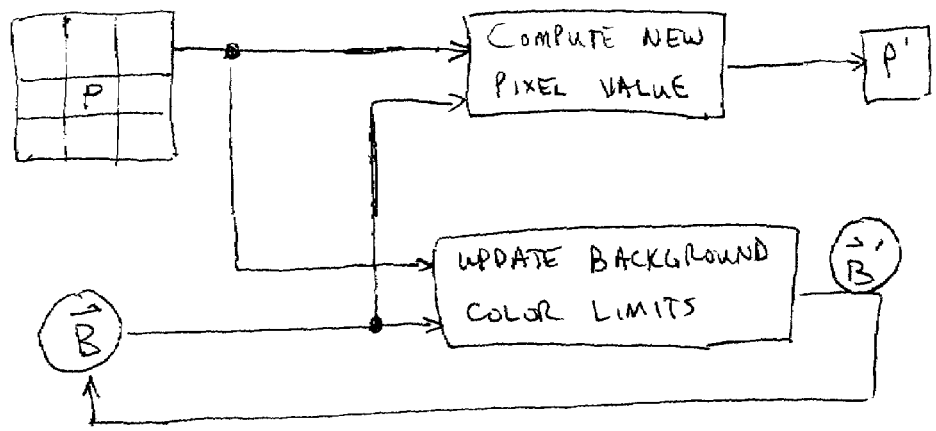
FIG. 7 is a block diagram illustrating an approach for implementing the automatic background removal mechanism according to one embodiment of the present invention.

FIG. 7 is a block diagram illustrating an approach for implementing the automatic background removal mechanism according to one embodiment of the present invention. For example, this approach can be utilized by the automatic background removal system 140. In this approach, a sliding window centered at pixel P is employed to compute a new pixel value P'. The parameters in $\vec{B}$ define a parallelepiped in luminance-chrominance space that gives the expected color of the document background.

In the preferred embodiment, the ABR mechanism of the present invention constructs a parallelepiped in luminance-chrominance space to specify the expected background color. Accordingly to one novel aspect of the present invention, the ABR mechanism automatically adjusts boundaries of the parallelepiped as the scan proceeds. Consequently, the expected background color can vary from scan to scan.

In this manner, the ABR of the present invention adapts to the document being scanned. Initially, the ABR adapts very quickly to the data (e.g., pixel values). Thereafter, as the scan proceeds, the ABR's adaptation speed decreases or slows.

An important aspect of the ABR of the present invention is that the ABR uses the parallelepiped boundaries in combination with an activity metric to estimate the probability that a given pixel is a background pixel. The activity metric serves to accurately detect light values that are part of a scanned halftone region. Consequently, the ABR of the present invention does not push halftone regions to white, since halftone regions represent values intentionally printed on the page. However, the ABR of the present invention detects paper color and bleed-through since these forms of noise have low activity values.

In the preferred embodiment, the background color is represented by six values that define the boundaries of the parallelepiped. For a CIELab representation, this can be expressed as $$\vec{B} = \{L_{min}, L_{max}, a_{min}, a_{max}, b_{min}, b_{max}\}$$

The local activity is computed from the pixel luminance component. If $P_L = L_{i,j}$ is the luminance value of pixel P at location i, j, the metric can be expressed as $$A = \frac{\sum |L_{i,j} - L_{i-1,j}| - |\sum L_{i,j} - L_{i-1,j}| + \sum |L_{i,j} - L_{i,j-1}| - |\sum L_{i,j} - L_{i,j-1}|}{\sum |L_{i,j} - L_{i-1,j}| + \sum |L_{i,j} - L_{i,j-1}| + K}$$

where the sums are over the pixel window. We use a constant value K=8*(number of pixels in window).

The local activity A is used to update the activity metric Act, which is basically a smoothed version of A.

$$Act = 0.75 Act + 0.25 A$$

Given the background color parameters $\vec{B}$ and the local activity A, the pixel is pushed towards white according to a distance measure D.

$$D = \left(\frac{L_{i,j} - \overline{L}}{L_{max} - L_{min}}\right)^2 + \left(\frac{a_{i,j} - \overline{a}}{a_{max} - a_{min}}\right)^2 + \left(\frac{b_{i,j} - \overline{b}}{b_{max} - b_{min}}\right)^2 + 16(Act)^2$$

where ($\overline{L}$, $\overline{a}$, $\overline{b}$) is the center of the parallelepiped defined by the background color parameters $\vec{B}$.

In the preferred embodiment, the distance measure or metric is the square of a normalized Euclidean distance plus an activity term. It is noted that alternatively other distance measures that are well known in the art can be employed provided that the activity metric is incorporated therein.

In this embodiment, a large value of D corresponds to a pixel that is either far from the "desired" value given by the parallelepiped or has a high activity. Since the parallelepiped is defined to represent background pixels (paper color), a large value of D indicates a pixel that is probably not a background pixel, while small values of D correspond to pixels that are likely to be background pixels.

For example, in step 330, the CIELab pixel values can be updated based on the value of D. Specifically, we first compute a weighting factor wt=C/(C+D), where C is a scalar constant (we use C=2). Note that as D increases, the weighting factor approaches zero. The new pixel values in CIELab (shifted and scaled to be in the range 0–255) are given as $$L' = \left[L \frac{255}{L_{min}}\right] \cdot wt + L \cdot (1 - wt)$$

$$a' = a \cdot (1 - wt)$$

$$b' = -32 \cdot wt + b \cdot (1 - wt)$$

where white is (L=255, a=0, b=−32).

Note that as D→0, the new CIELab value approaches white. For very large D, the CIELab value remains unchanged. Pixels that look more like background are thus pushed towards white, while other pixels remain unchanged. Since the remapping is based on a continuous weighting factor, the ABR of the present invention avoids the contouring that can result from a hard segmentation into background and non-background pixels.

For example, in step 340, the background parameters $\vec{B}$ can be updated based on the observed pixel value. Since the paper color, and hence the background CIELab values, can change from scan to scan, the ABR method and system of the present invention adapts to the changing conditions by estimating parameters as the scan proceeds.

Figure 8:
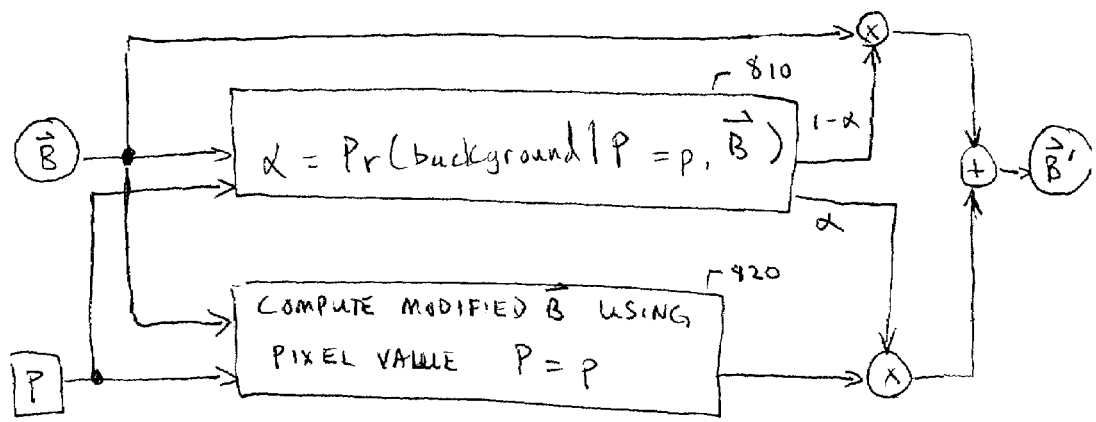
FIG. 8 is a block diagram illustrating an approach for automatically updating the background parameters according to one embodiment of the present invention.

FIG. 8 is a block diagram illustrating an approach for automatically updating the background parameters according to one embodiment of the present invention. In this exemplary adaptation procedure Pr(X=x|Y=y,Z) is the probability that random variable X is equal to x given parameter Z and the random variable Y=y. Similarly, in block 810, Pr(background|P=p,$\vec{B}$) is the probability that P is a background pixel given its value and the value of the background parameters $\vec{B}$.

When the probability α is near zero, the updated parameters remain essentially unchanged. When the probability is near one, on the other hand, the parameters are modified using the corresponding pixel value P=p. The modification equations utilized in block 820 can take the same form for each of the elements of $\vec{B}$. When the generic variable T represents an arbitrary element of $\vec{B}$, the updated value of T is given by $$\tilde{T} = \gamma \cdot T + \beta \cdot (1-\gamma) \cdot (\text{value from this pixel})$$

Figure 4:
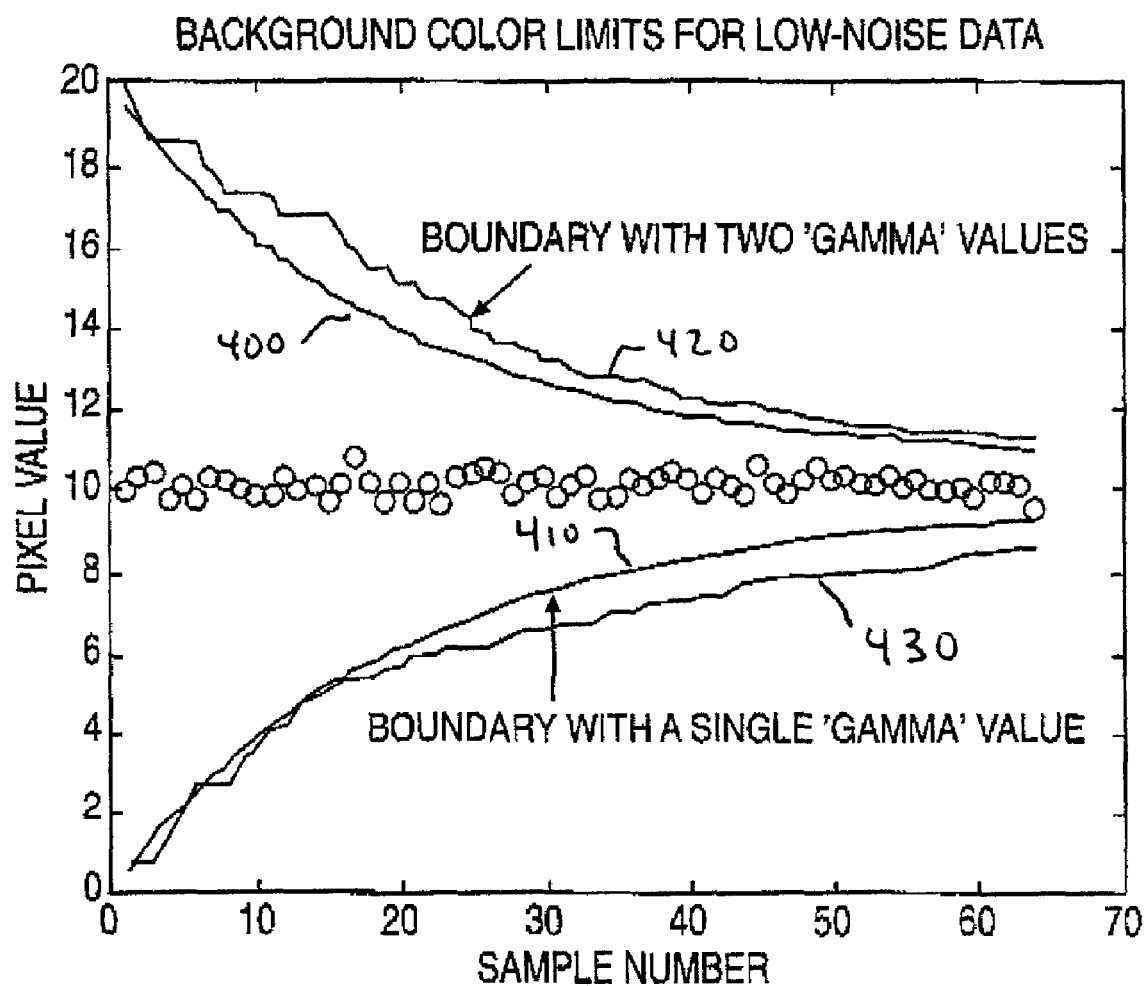
FIG. 4 is an exemplary pixel value versus sample number graph for background color limits with low-noise data.

The adaptation parameter γ changes over time so the adaptation is rapid initially and slows down as the scan progresses. A smaller value of γ gives faster adaptation. Two different values of γ are used for the parameter updates to give a parallelepiped for background color that is larger for noisy scans. For the luminance component, the updates are given by if (L>$\tilde{L}$)
$\tilde{L}_{min} = \gamma_1 \cdot L_{min} + \beta_1 \cdot (1-\gamma_1) \cdot L$
$\tilde{L}_{max} = \gamma_2 \cdot L_{max} + \beta_2 \cdot (1-\gamma_2) \cdot L$
else
$\tilde{L}_{min} = \gamma_2 \cdot L_{min} + \beta_1 \cdot (1-\gamma_2) \cdot L$ where $\gamma_1 > \gamma_2$
$\tilde{L}_{max} = \gamma_1 \cdot L_{max} + \beta_2 \cdot (1-\gamma_1) \cdot L$ FIG. 4 is an exemplary pixel value versus sample number graph for background color limits with low-noise data. A maximum boundary 400 with a single gamma value, a minimum boundary 410 with a single gamma value, a maximum boundary 420 with two gamma values, and a minimum boundary 430 with two gamma values are shown.

Figure 5:
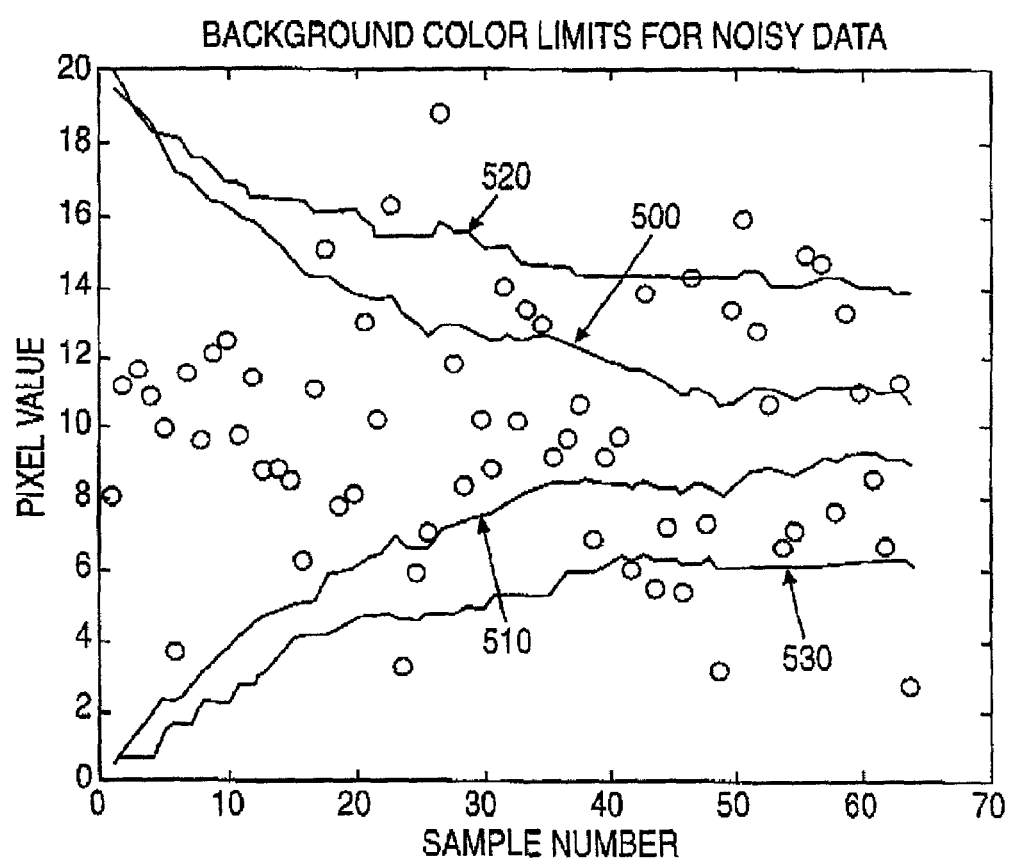
FIG. 5 is an exemplary pixel value versus sample number graph for background color limits with high-noise data.

FIG. 5 is an exemplary pixel value versus sample number graph for background color limits with high-noise data. A maximum boundary 500 with a single gamma value, a minimum boundary 510 with a single gamma value, a maximum boundary 520 with two gamma values, and a minimum boundary 530 with two gamma values are shown.

By using two different gamma values in the parameter update, the size of the parallelepiped increases if the pixel samples have more variability. For example, although the set of pixel values shown in FIG. 4 has the same average value as the set of pixel values shown in FIG. 5, the set of pixel values shown in FIG. 5 exemplify more variability. It is noted that the minimum and maximum boundary values associated with the use of a single gamma value converge to the same values for both sets of data (i.e., both for the low noise data and the high noise data). In contrast, the minimum and maximum boundary values associated with the use of two gamma values converge to different values for the different sets of data (i.e., the range between the minimum and maximum boundary values increases as the variability of the data samples increases). For example, the range between the maximum boundary 520 and minimum boundary 530 is greater than the range between the maximum boundary 420 and the minimum boundary 430, thereby indicating that the boundaries with two gamma values depend on the variability of the data.

These graphs illustrate the advantage of using two different values of γ for the luminance component. The two chrominance components are handled in an analogous fashion. The values of $\gamma_1$ and $\gamma_2$ are based on the current value of ($\alpha_{max} - \alpha_{min}$). Initially, the background color is unknown, so this difference is large. As the scan progresses, the parameters converge to a narrower range about the actual background color. By setting $\gamma_1$ and $\gamma_2$ to increase as this difference decreases, the overall speed of adaptation decreases as the scan progresses. In the preferred implementation, the values of $\gamma_1$ and $\gamma_2$ are set as follows:

$$\gamma_1 = 1 - 0.009\sqrt{\alpha_{max} - \alpha_{min}}$$

$$\gamma_2 = 0.95 \cdot \gamma_1$$

The parameters $\beta_1$ and $\beta_2$ in the update equations above are used to prevent the minimum and maximum values from converging to the same number. Preferably, parameters $\beta_1$ and $\beta_2$ are set as follows: $\beta_1 = 0.95$ and $\beta_2 = 1.05$. Alternatively, the parameters $\beta_1$ and $\beta_2$ values can be adjusted based on expected variability of the background.

$$\beta_1 = 1 - \nu$$

$$\beta_2 = 1 + \nu$$

By changing the value of ν, the minimum and maximum parameters can further be adjusted closer together or farther apart. In general, as the values get further apart, more pixels are pushed to white or near-white. In the preferred embodiment, the value of ν is set as follows: ν=0.05.

One aspect of the ABR mechanism of the present invention is computing α, the probability that pixel P is a background pixel. This computation can be based on a specific probabilistic model for the pixel values. For example, the probability α can be computed as follows:

$$\alpha = Pr\left(background \mid P = p, \vec{B}\right) = Pr\left(bg \mid P = p, \vec{B}\right) = $$

$$\frac{Pr\left(P = p \mid bg, \vec{B}\right) Pr\left(bg \mid \vec{B}\right)}{Pr\left(P = p \mid bg, \vec{B}\right) Pr\left(bg \mid \vec{B}\right) + Pr\left(P = p \mid \overline{bg}, \vec{B}\right) Pr\left(\overline{bg} \mid \vec{B}\right)}$$

where bg indicates a background pixel, and $\overline{bg}$ indicates a non-background pixel. We set α=0 if any of the following hold: L<$L_{min}$; a<$a_{min}$; a>$a_{max}$; b<$b_{min}$; b>$b_{max}$. Note that $L_{max}$ is treated differently since the probability that an extremely light pixel is background should not go to zero (i.e., it is not possible to print content that is lighter than the paper color). If none of these conditions hold, α may be approximated by using only the luminance component. It is noted that using all three components may give too small a transition region between pixels with probability near zero and pixels with probability near one. Consequently, in the preferred embodiment, the following simplified expression provides better results:

$$\alpha \approx Pr\left(bg \mid P_L = L, \vec{B}\right) = $$

$$\frac{Pr\left(P_L = L \mid bg, \vec{B}\right) Pr\left(bg \mid \vec{B}\right)}{Pr\left(P_L = L \mid bg, \vec{B}\right) Pr\left(bg \mid \vec{B}\right) + Pr\left(P_L = L \mid \overline{bg}, \vec{B}\right) Pr\left(\overline{bg} \mid \vec{B}\right)}$$

It is important to model Pr($P_L$=L|bg,$\vec{B}$), Pr($P_L$=L|$\overline{bg}$,$\vec{B}$), and Pr(bg|$\vec{B}$) quantity Pr($\overline{bg}$|$\vec{B}$)=1−Pr(bg|$\vec{B}$), so it does not need to be modeled separately. The following distributions may be employed:

$$Pr\left(P_L = L \mid \overline{bg}, \vec{B}\right) = \frac{1}{256} \text{ Uniform on } 0 \cdots 255$$

$$Pr\left(P_L = L \mid bg, \vec{B}\right) = \begin{cases} 0 & L < L_{\min} \\ \frac{1}{256} + \left(\frac{L_{\min}}{256}\right) \cdot \left(\frac{0.5 \cdot (L_{\max} - L_{\min}) - |L - \overline{L}|}{\lfloor 0.5 \cdot (L_{\max} - L_{\min}) \rfloor \cdot \lceil 0.5 \cdot (L_{\max} - L_{\min}) \rceil}\right) & L_{\min} \leq L \leq L_{\max} \\ \frac{1}{256} & L > L_{\max} \end{cases}$$

$$Pr\left(bg \mid \vec{B}\right) = \frac{\sum_{P \in \Omega} Pr\left(bg \mid P_L = L, \vec{B}\right)}{|\Omega|} \text{ where } \Omega \text{ is the set of all scan pixels seen so far.}$$

Since the luminance value L can take on any integer value from 0 to 255, each of the density functions is appropriately scaled to sum to one.

Figure 6:
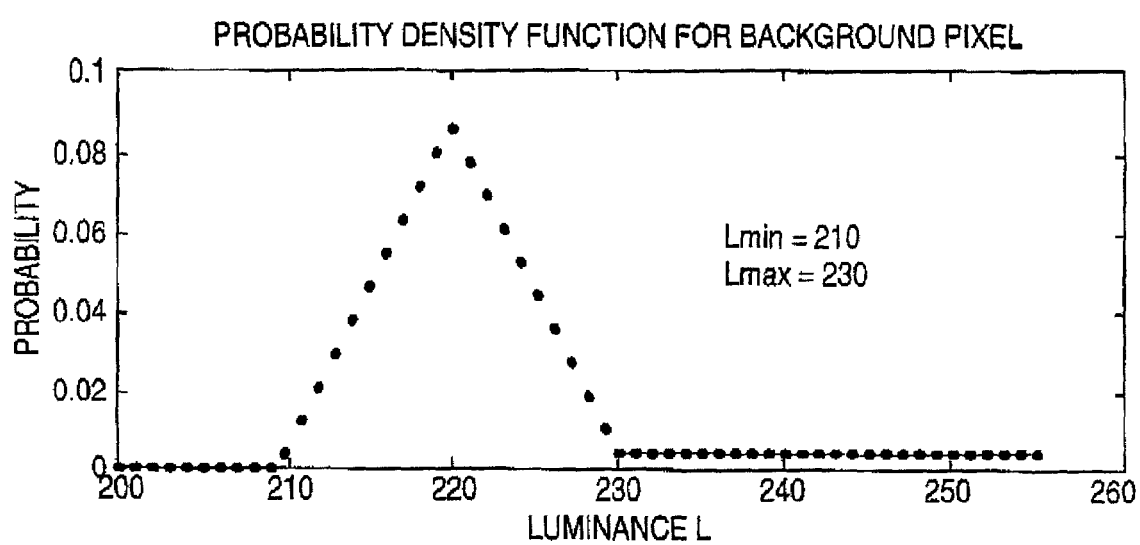
FIG. 6 is an exemplary probability versus luminance graph of a probability density function for a background pixel.

FIG. 6 is an exemplary probability versus luminance graph of a probability density function for a background pixel. In this example, the density function for a background pixel is a triangular distribution that reaches its peak at the midpoint between $L_{min}$ and $L_{max}$. Specifically, FIG. 6 illustrates the density function for $Pr(P_L=L|bg,\vec{B})$ for $L_{min}=210$ and $L_{max}=230$. Using the probability densities described above, the ABR mechanism of the present invention provides the following complete update procedure for the background parameters $\vec{B}$:

For each image pixel P in raster order,
1. Compute local activity A and use it to update activity metric Act.
2. Compute distance metric D.
3. Compute L', a', and b' for this pixel
4. Calculate the new background parameters $\vec{B}'$ using update equations and computation of $\alpha=Pr(bg|P=p,\vec{B})$
5. Update $Pr(bg|\vec{B})$
6. Replace $\vec{B}$ with newly computed value $\vec{B}'$
7. Substitute p'=(L', a', b') for pixel value P=p in the output image Both the variability parameter ν and the window size can be modified to alter the behavior of the algorithm. As expected background variability ν is set larger, more of the pixels are pushed towards white.

The window size is typically set to either 3×3 or 5×5, with each size having some advantages over the other. The smaller window not only reduces the required memory buffer and processing, but also gives better resolution. This leads to an improved detection of background pixels among text characters. However, the larger window gives better halftone rejection, resulting in fewer halftone regions being pushed towards white.

A system and method of removing background from a scanned document of the present invention that is very robust has been described. The ABR mechanism automatically adjusts to the document as the document is scanned and pushes the background paper color towards white. However, pixels that exhibit a halftone pattern are skipped. It is noted that the variability parameter and window size can be adjusted to improve results on a known scanning platform or a known type of document.

In the foregoing specification, the invention has been described with reference to specific embodiments thereof. It will, however, be evident that various modifications and changes may be made thereto without departing from the broader scope of the invention. The specification and drawings are, accordingly, to be regarded in an illustrative rather than a restrictive sense.

What is claimed is:

1. A method for automatically removing noise comprising the steps of:
   a) receiving a current pixel;
   b) computing an activity metric of the current pixel by using the current pixel and a neighborhood of pixels related to the current pixel;
   c) computing a distance metric for indicating the likelihood that the current pixel is a background pixel by using the activity metric and at least one background parameter; and
   d) modifying the current pixel based on the distance metric;
   wherein the distance metric provides a soft thresholding framework.

2. The method of claim 1 further comprising the steps of:
   updating the background parameter based on the current pixel;
   wherein the updated background parameter is employed to compute the distance metric for the next current pixel.

3. The method of claim 1 wherein the current pixel includes a luminance component and a chrominance component; and wherein the step of computing an activity metric of the current pixel by using the current pixel and a neighborhood of pixels related to the current pixel includes:
   computing a local activity based on the luminance component of the current pixel; and
   computing the activity metric based on the local activity.

4. The method of claim 1 wherein the current pixel includes a luminance component and a chrominance component; and wherein the step of computing a distance metric for indicating the likelihood that the current pixel is a background pixel by using the activity metric and at least one background parameter includes:
   computing a square of a normalized Euclidean distance based on the luminance component and a chrominance component of the current pixel; and
   generating a sum of the square of a normalized Euclidean distance and an expression that includes the activity metric.

5. The method of claim 1 wherein the current pixel is represented by an L component, an a component, and a b component; and wherein the step of modifying the current pixel based on the distance metric includes:

generating a modified L component based on the current L component and the distance metric;

generating a modified a component based on the current a component and the distance metric; and generating a modified b component based on the current b component and the distance metric.

6. The method of claim 1 wherein the method is applied in a luminance-chrominance color space.

7. The method of claim 6 wherein the luminance-chrominance color space is one of a CIELab color space and YCrCb color space.

8. The method of claim 1 wherein the step of receiving a current pixel includes:

scanning a current line of pixels that includes the current pixel; and scanning one of at least a first line of pixels above the current line and a second line of pixels below the current line.

9. The method of claim 4 wherein the step of computing an activity metric of the current pixel by using the current pixel and a neighborhood of pixels related to the current pixel includes:

computing an activity metric of the current pixel based on the current pixel and a square window of pixels that are centered around the current pixel.

10. The method of claim 1 wherein the step of modifying the current pixel based on the distance metric includes:

adjusting the current pixel value based on the probability that the current pixel is a background pixel.

11. The method of claim 10 wherein the step of adjusting pixel value based on probability that a pixel is a background pixel includes the step of adjusting the pixel value by an amount that is based on the probability.

12. The method of claim 10 wherein the activity metric is used to distinguish between a background pixel and a halftone pixel.

13. The method of claim 1 further comprising the step of:

using the activity metric to detect light values that are part of a scanned halftone region;

selectively not affecting the light values that are part of the scanned halftone region; and.

selectively modifying the pixel values that are not part of the scanned halftone region.

14. A method of processing a document comprising the steps of:

a) constructing a parallelepiped having boundaries in luminance and chrominance space to specify an expected background color;

b) automatically adjusting the boundaries of the parallelepiped as a scan proceeds; and wherein the method selectively adapts the background color based on the pixel values of the document being processed.

15. The method of claim 14 further comprising the step of:

determining the probability that a current pixel is a background pixel based on the boundaries of the parallelepiped.

16. The method of claim 14 wherein the method is applied in a luminance-chrominance color space.

17. The method of claim 16 wherein the luminance-chrominance color space is one of a CIELab color space and YCrCb color space.

18. A computer-implemented method for automatically removing background pixels comprising the steps of:

a) receiving a current pixel;

b) determining a probability that the current pixel is a background pixel based on a dynamic background threshold;

c) modifying the current pixel based on the probability that the current pixel is a background pixel; and d) updating the dynamic background threshold based on the current pixel and the background threshold.

19. The method of claim 18 wherein determining a probability that the current pixel is a background pixel based on a dynamic background threshold includes the steps of computing the probability that the current pixel is a background pixel by using a sliding window of pixels that are neighbors of the current pixel;

wherein the method is a single pass approach that does not require a pre-scan.

20. The method of claim 18 wherein the method is applied in a luminance-chrominance color space that is one of a CIELab color space and YCrCb color space.

* * * * *